Patented Jan. 6, 1953

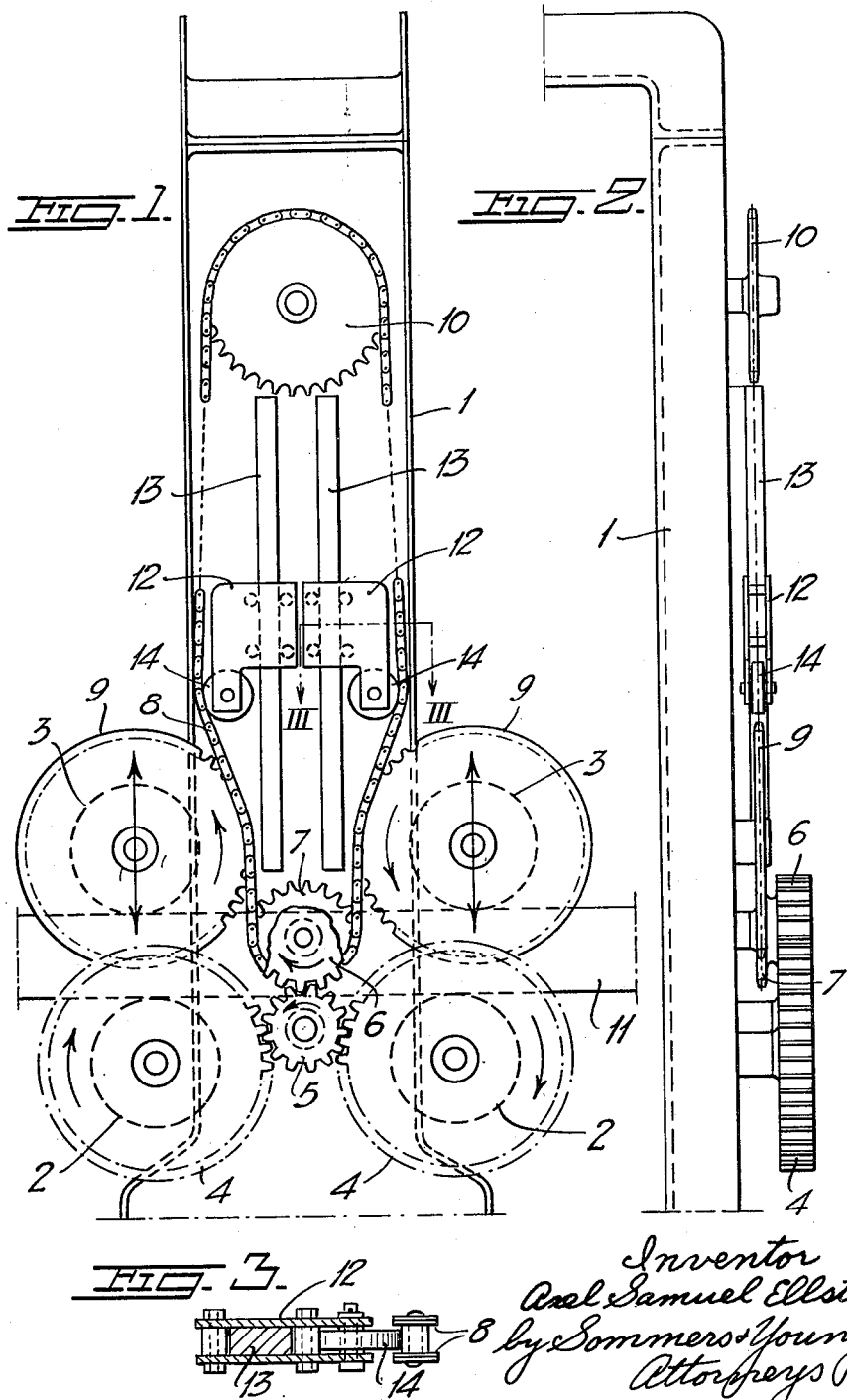

2,624,205

UNITED STATES PATENT OFFICE 2,624,205

SAW FRAME

Axel Samuel Ellström, Skutskar, Sweden, assignor to Söderhamns Verkstäder Aktiebolag, Soderhamn, Sweden Application September 27, 1948, Serial No. 51,359
In Sweden December 21, 1946

2 Claims. (Cl. 74—242.14)

The present invention relates to saw frames and more particularly to a chain drive for the feed rollers of saw frames.

Hitherto known chain drives for operating the feed rollers of saw frames suffer from the drawback that the chain engages a single tooth or a few teeth only of the driven chain wheels of the feed rollers with a resulting tendency for the chain to slip with relation to the driving chain wheel, thereby rendering the feed motion irregular and giving rise to a rapid wearing out of the teeth of the chain wheels, the chain guiding means and the chain itself.

The object of the invention is to overcome this drawback. To this end the invention is characterized by the provision of means for maintaining the chain sides in a curved state in engagement with the driven chain wheels of the feed rollers so as to cause the chain sides to engage an increased number of teeth of said chain wheels irrespective of the vertical movements of the top feed rollers as caused by the varying diameter of the log while passing the saw frame from its top end to its base end. By this means the tendency of slipping of the chain may be completely avoided with a resulting uniform feeding and increased sawing capacity.

In the accompanying drawing an embodiment of the invention is illustrated. In the drawing:

Fig. 1 is a side elevation of a chain drive according to the invention with certain parts shown diagrammatically only, Fig. 2 is an end view, looking from the left hand side of Fig. 1, and Fig. 3 is a cross section on the line III—III of Fig. 1 on a larger scale.

With reference to the drawing the numeral 1 indicates a portion of the saw frame. Mounted in stationary bearings in said frame are two bottom feed rollers 2 and mounted in vertically slidable bearings (not shown) are two top feed rollers 3. The arrangement of the feed rollers 2 and 3 is assumed to be conventional so that it is not considered necessary to describe or show them in detail. The vertical movement of the bearings for the top feed rollers 3 is for the well-known purpose of allowing said rollers to suit the varying diameter of logs or each individual log passing through the saw frame. The bottom feed rollers 2 are provided with toothed wheels 4 engaged by a common pinion 5 which also engages a toothed wheel 6 rigidly connected to a chain wheel 7 which forms the driving wheel of an endless chain 8 engaging chain wheels 9 of the top feed rollers 3 by its substantially vertically extending sides. At the top of the frame the chain is guided by a loose pulley 10 the shaft of which is mounted in a stationary bearing. As will appear from the arrows shown on the various wheels the top and bottom feed rollers rotate all in such directions as to feed the log 11 to the right in the drawing.

Provided in the space between the substantially vertical sides of the endless chain 8 are two carriages 12 mounted to move freely, independently of each other, along vertical or substantially vertical guiding posts 13. Rotatably mounted in each carriage is a small wheel 14 engaging the respective side of the chain so as to maintain it in a curved state in engagement with the chain wheel 9 to be driven thereby, so that the chain sides may engage a large number of teeth of said wheels as compared with straight chain sides. When the top feed rollers 3 and thus also the associated chain wheels 9 are moved upwards according as the diameter of a log passing through the frame increases from its top end to its base end, the small wheels 14 are forced upwards against the action of the weight of their carriages in such a way as to maintain the angle of engagement between the chain sides and the chain wheels 9 constant or substantially constant irrespective of the level of the carriages.

It is to be noted that the bottom feed rollers may be driven in a different way from that shown, as for instance, without departing from the principle of the invention. It is also to be noted that the small wheels 14 may be substituted by other appropriate members. The wheels 14 or said other members may be loaded by springs instead of or in addition to by the weight of their supporting carriages.

What I claim is:

1. In a chain drive mechanism for a pair of vertically adjustable parallel top feed rollers of a saw frame log feeding device, in which the chain is endless and of substantially vertical disposition, engaging by each lateral portion a chain wheel of the respective feed roller, the improvement comprising the provision with each such lateral chain portion of a tightening pulley engaging the chain portion at a lateral distance from the vertical plane through the axis of the feed roller which is less than the radius of the respective chain wheel, a vertically movable carriage for supporting said tightening pulley, and means for guiding the carriages vertically while allowing them to move freely independently of each other and to act as loads for the tightening pulleys, thereby causing them to bend the lateral chain portion around a large portion of the periphery of the chain wheels as compared with an engagement between the chain wheels and straight portion of the chain.

2. A chain drive mechanism as claimed in claim 1, and in which the means for guiding the carriages comprises a vertical post for each carriage provided in the space between the said lateral portions of the chain, each carriage being mounted to move easily along its guiding post.

AXEL SAMUEL ELLSTRÖM.

REFERENCES CITED

The following references are of record in the file of this patent:

UNITED STATES PATENTS

| Number | Name | Date |
|---|---|---|
| 1,947,397 | Kassay | Feb. 13, 1934 |
| 2,185,079 | Hall | Dec. 26, 1939 |

FOREIGN PATENTS

| Number | Country | Date |
|---|---|---|
| 36,566 | Sweden | Feb. 25, 1913 |
| 540,099 | Germany | Feb. 24, 1932 |